US009133290B2

(12) United States Patent
Yan et al.

(10) Patent No.: US 9,133,290 B2
(45) Date of Patent: Sep. 15, 2015

(54) FUNCTIONALIZED POLYMERS AND PROCESSES FOR MAKING SAME

(75) Inventors: Yuan-Yong Yan, Copley, OH (US); Steven Luo, Copley, OH (US); Mark T. Arigo, Zachary, LA (US)

(73) Assignee: Brigdestone Corporation, Tokyo (JP)

( * ) Notice: Subject to any disclaimer, the term of this patent is extended or adjusted under 35 U.S.C. 154(b) by 1315 days.

(21) Appl. No.: 12/935,863

(22) PCT Filed: Mar. 30, 2009

(86) PCT No.: PCT/US2009/038809
§ 371 (c)(1),
(2), (4) Date: Mar. 25, 2011

(87) PCT Pub. No.: WO2009/146018
PCT Pub. Date: Dec. 3, 2009

(65) Prior Publication Data
US 2011/0172369 A1    Jul. 14, 2011

Related U.S. Application Data

(60) Provisional application No. 61/041,101, filed on Mar. 31, 2008, provisional application No. 61/049,397, filed on Apr. 30, 2008, provisional application No. 61/083,243, filed on Jul. 24, 2008.

(51) Int. Cl.
| | |
|---|---|
| *C08F 8/30* | (2006.01) |
| *C08F 36/06* | (2006.01) |
| *C08F 8/32* | (2006.01) |
| *C08F 36/04* | (2006.01) |
| *C08C 19/44* | (2006.01) |
| *C08K 3/00* | (2006.01) |

(52) U.S. Cl.
CPC ............... *C08F 36/04* (2013.01); *C08C 19/44* (2013.01); *C08K 3/0033* (2013.01)

(58) Field of Classification Search
CPC ..... C08L 19/006; C08L 2205/02; C08L 9/06; C08K 5/47; C08F 36/04; C08F 297/02; C08F 4/12
USPC .................... 525/375, 333.2, 333.7
See application file for complete search history.

(56) References Cited

U.S. PATENT DOCUMENTS

| | | | |
|---|---|---|---|
| 4,229,308 A | 10/1980 | Brulet et al. | |
| 4,927,887 A * | 5/1990 | Tate et al. ................ | 525/279 |
| 4,935,471 A | 6/1990 | Halasa et al. | |
| 5,266,653 A | 11/1993 | Abraham | |
| 7,067,592 B2 | 6/2006 | Chino et al. | |
| 8,183,326 B2 | 5/2012 | Yan et al. | |
| 8,389,644 B2 | 3/2013 | Brumbaugh et al. | |
| 2006/0025539 A1* | 2/2006 | Ozawa et al. ............. | 525/377 |
| 2006/0189755 A1 | 8/2006 | Chino et al. | |
| 2008/0103252 A1* | 5/2008 | Brumbaugh et al. ...... | 524/612 |
| 2008/0154020 A1 | 6/2008 | Yan et al. | |

FOREIGN PATENT DOCUMENTS

| | | | | |
|---|---|---|---|---|
| JP | 04246401 | * | 9/1992 | ............ C08C 19/22 |

OTHER PUBLICATIONS

JPO action in counterpart JP appl. No. 2011-503077, mailed Oct. 8, 2013 (5 pp., plus 6-page translation).
S. Rádl, "Crisscross Cycloaddition Reactions," *Aldrichimica Acta*, 1997, vol. 30, No. 3, pp. 97-100 (Sigma-Aldrich Co., Inc.; Milwaukee, Wisconsin).
R. Cohen et al., "Novel Azine Reactivity: Facile N-N Bond Cleavage, C-H Activation, and N-N Coupling Medated by Rh$^{I^{*},^{*}}$," *Angew. Chem. Int. Ed.*, 2003, vol. 42, pp. 1949-1952 (Wiley-VCH Verlag GmbH & Co.; Weinheim, Germany).
JPO action in JP appl. No. 2013-252446, mailed Nov. 18, 2014 (4 pages, plus 6-page translation).

* cited by examiner

*Primary Examiner* — Ling Choi
*Assistant Examiner* — Chun-Cheng Wang
(74) *Attorney, Agent, or Firm* — Meredith E. Hooker; David G. Burleson

(57) ABSTRACT

A macromolecule includes at least one polymer chain with at least one functionality. The polymer can include unsaturated mer units and can be provided via anionic and pseudo-living polymerization techniques. In either technique, the functionality can include at least one 5- or 6-membered ring which includes a secondary amine group and at least one additional heteroatom; in the latter technique, the functionality can include a hydrazone radical. Such polymers can be used to provide compositions that also include particulate fillers, such compositions being useful for the production of vulcanizates.

20 Claims, No Drawings

FUNCTIONALIZED POLYMERS AND PROCESSES FOR MAKING SAME

CROSS-REFERENCE TO RELATED APPLICATIONS

This is a national stage entry application of international application No. PCT/US2009/038809, filed, 30 Mar. 2009, and claims the benefit of U.S. provisional patent appl. No. 61/041,101, filed 31 Mar. 2008; U.S. provisional patent appl. No. 61/049,397, filed 30 Apr. 2008; and U.S. provisional patent appl. No. 61/083,243, filed 24 Jul. 2008, the entire disclosures of which are incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, surface grafting, and chemically modifying the polymer, typically at a terminus thereof.

Various elastomeric materials often are used in the manufacture of vulcanizates such as, e.g., tire components. In addition to natural rubber, some of the most commonly employed include high-cis polybutadiene, often made by processes employing catalysts, and substantially random styrene/butadiene interpolymers, often made by processes employing anionic initiators. Functionalities that can be incorporated into polymers prepared by one of these processes often cannot be incorporated into polymers prepared by the other type.

Cis-1,4-polydienes produced with lanthanide-based catalysts often have a linear structure, which is believed to provide improved tensile properties, improved abrasion and fatigue resistance, and reductions in hysteresis loss. Such cis-1,4-polydienes thus are particularly suitable for use in tire components such as sidewalls and treads.

SUMMARY

In one aspect is provided a method for providing a polymer having terminal functionality which includes an amine group and at least one other heteroatom-containing group. The method involves reacting a terminally active polymer with a compound that includes a ring structure which includes at least two heteroatoms selected from O, P, S and N and at least one >C=N— segment. (The N atom of the segment can constitute one of the at least two heteroatoms.) This reaction results in the polymer having terminal functionality.

In the foregoing method, the compound can include at least two N atoms and, when this is true, also can include at least two >C=N— segments which can be in the same or different rings of the ring system. If desired, the method can involve reacting at least one additional terminally active polymer with the compound, which results in polymer chains coupled through a terminal functionality that can interact with particulate fillers.

In another aspect is provided a macromolecule that includes at least one polymer chain which includes unsaturated mer units and terminal functionality. The terminal functionality includes a ring system which includes a secondary amine group and at least one additional heteroatom selected from O, P, S and N. The macromolecule can include two or more polymer chains, each of which is chemically bonded to the terminal functionality. The macromolecule can include two or more N atoms, which can be in the same or different rings of the ring system.

In each of the foregoing, some or all of the polymer chains preferably includes polyene mer units. In certain embodiments, the polyenes can be conjugated dienes, and the resulting conjugated diene mer can incorporated substantially randomly along the polymer chain.

In each aspect, the polymer can be substantially linear. The substantially linear polymer can include as a terminal moiety the radical of a compound that includes a ring system that includes at least two heteroatoms selected from O, P, S and N and at least one >C=N— segment (where the N atom of the segment can constitute one of the at least two heteroatoms). The radical of this compound provides the polymer with a terminal functionality bound to the polymer chain through the C atom of the specifically referenced segment, i.e., the double bond of the segment is replaced with a bond between the C atom and an atom, typically a C atom, of the polymer chain.

In an additional aspect is provided another process for making a functionalized polymer. In general, the process involves reacting a terminally active polymer, specifically a pseudo-living polymer, with a hydrazone so as to provide a polymer that includes hydrazine functionality. In certain aspects, one of the nitrogen atoms constituting the hydrazine functionality can constitute one of the atoms of a cyclic moiety. The hydrazine functionality optionally can be reduced to a primary amine group.

The preceding process can result in a polymer that includes a directly bonded hydrazone radical, typically located at a terminus of the polymer. In certain embodiments, the resulting functionalized polymer can be described as a polymer chain and, directly bonded to that chain, a moiety defined by the formula

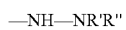

—NH—NR'R''       (I)

where R' and R'' each independently is a substituted or unsubstituted alkyl, alkenyl, cycloalkyl, cycloalkenyl, aryl, allyl, aralkyl, alkaryl, or alkynyl group, or together form a substituted or unsubstituted alkylene, alkenylene, cycloalkylene, cycloalkenylene, or arylene group.

Each of the foregoing functionalized polymers can interact with particulate fillers such as, e.g., carbon black and silica. Compositions, including vulcanizates, that include particulate fillers and such polymers also are provided, as are methods of providing and using such compositions.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —CH$_2$CH$_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"hydrazone" means a compound that include a >C=N—N< unit;

"hydrazine" means a compound that include a —NH—N< unit;

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" means the portion of a molecule that remains after reacting with another molecule, regardless of whether any atoms are gained or lost as a result of the reaction;

"lanthanide compound" means a compound that includes at least one atom of La, Nd, Ce, Pr, Pm, Sm, Eu, Gd, Tb, Dy, Ho, Er, Tm, Yb, Lu, and didymium (a mixture of rare-earth elements that can be obtained from monazite sand);

"organoaluminum compound" means a compound containing at least one Al—C bond;

"organomagnesium compound" means a compound containing at least one Mg—C bond;

"non-coordinating anion" means a sterically bulky anion that does not form coordinate bonds with, for example, the active center of a catalyst system due to steric hindrance;

"non-coordinating anion precursor" means a compound that is able to form a non-coordinating anion under reaction conditions;

"ring system" means a single ring or two or more fused rings or rings linked by a single bond, with the proviso that each ring includes unsaturation;

"drop temperature" is a prescribed upper temperature at which a filled rubber composition (vulcanizate) is evacuated from mixing equipment (e.g., a Banbury mixer) to a mill for being worked into sheets;

"terminus" means an end of a polymeric chain;

"terminally active" means a polymer with a living or pseudo-living terminus; and "terminal moiety" means a group or functionality located at a terminus.

Throughout this document, all values given in the form of percentages are weight percentages unless the surrounding text explicitly indicates a contrary intention. The entire disclosure of each specifically mentioned patent document is incorporated herein by reference.

DETAILED DESCRIPTION OF ILLUSTRATIVE EMBODIMENTS

As apparent from the foregoing, the polymer can be described or characterized in a variety of ways. Generally, it includes unsaturated mer units, typically units derived from one or more types of polyenes, and functionality that includes a ring system which includes a secondary amine group and at least one additional O, P, S and/or N atom or that is defined by formula (I). The latter can be provided as a hydrazone radical.

In certain embodiments, the polymer can be provided by reacting a terminally active polymer with a compound that includes a ring system that includes at least two O, P, S and/or N atoms and at least one >C=N— segment. The N atom of this segment can constitute one of the at least two heteroatoms and, in some embodiments, the N atoms from two >C=N— segments can constitute the two heteroatoms in the ring system.

The polymer can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like.

Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from no more than ~80%, optionally no more than ~65%, can be desirable for certain end use applications. A polymer that has an overall 1,2-microstructure of no more than about 50%, preferably no more than about 45%, more preferably no more than about 40%, even more preferably no more than about 35%, and most preferably no more than about 30%, based on total polyene content, is considered to be "substantially linear". For certain end use applications, however, keeping the content of 1,2-linkages even lower—e.g., to less than about 7%, less than 5%, less than 2%, or less than 1%—can be desirable.

Depending on the intended end use, one or more of the polymer chains can include pendent aromatic groups, which can be provided, for example, through incorporation of mer units derived from vinyl aromatics, particularly the $C_8$-$C_{20}$ vinyl aromatics such as styrene, α-methyl styrene, p-methyl styrene, the vinyl toluenes, the vinyl naphthalenes, and the like. When used in conjunction with one or more polyenes, mer units with pendent aromatic groups can constitute from ~1 to ~50%, from ~10 to ~45%, or from ~20 to ~35%, of the polymer chain; the microstructure of such interpolymers can be random, i.e., the mer units derived from each type of constituent monomer do not form blocks and, instead, are incorporated in an essentially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The number average molecular weight ($M_n$) of the polymer typically is such that a quenched sample exhibits a gum Mooney viscosity (ML$_4$/100° C.) of from ~2 to ~150, more commonly from ~2.5 to ~125, even more commonly from ~5 to ~100, and most commonly from ~10 to ~75.

The foregoing types of polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Depending on the nature of the polymer desired, the particular conditions of the solution polymerization can vary significantly. In the discussion that follows, living polymerizations are described first followed by a description of pseudo-living polymerizations. After these descriptions, the functionalization and processing of polymers so made are discussed.

Solution polymerization typically involves an initiator such as an organolithium compound, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators also can be useful. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815).

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. The procedure typically is carried out under anhydrous, anaerobic conditions. The reactants can be heated to a temperature of up to about 150° C. and agitated. After a desired degree of conversion has been reached, the heat source (if used) can be removed and, if the reaction vessel is to be reserved solely for polymerizations, the reaction mixture is removed to a post-polymerization vessel for functionalization and/or quenching. At this point, the reaction mixture commonly is referred to as a "polymer cement" because of its relatively high concentration of polymer.

Generally, polymers made according to anionic techniques can have a $M_n$ of from ~50,000 to ~500,000 Daltons, although in certain embodiments the number average molecular weight can range from ~75,000 to ~250,000 Daltons or even from ~90,000 to ~150,000 Daltons.

Certain end use applications call for polymers that have properties that can be difficult or inefficient to achieve via anionic (living) polymerizations. For example, in some applications, conjugated diene polymers having high cis-1,4-linkage contents can be desirable. Polydienes can be prepared by processes using catalysts (as opposed to the initiators employed in living polymerizations), particularly lanthanide-based catalysts, which often are described as displaying pseudo-living characteristics.

Some catalyst systems preferentially result in cis-1,4-polydienes, while others preferentially provide trans-1,4-polydienes. The ordinarily skilled artisan is familiar with examples of each type of system. The remainder of this description is based on a particular cis-specific catalyst system, although this merely is for sake of exemplification and is not considered to be limiting to the functionalizing method and compounds.

Exemplary catalyst systems can employ lanthanide metals which are known to be useful for polymerizing conjugated diene monomers. Specifically, catalyst systems that include a lanthanide compound can be used to provide cis-1,4-polydienes from one or more types of conjugated dienes. The term "catalyst composition" is intended to encompass a simple mixture of ingredients, a complex of various ingredients that is caused by physical or chemical forces of attraction, a chemical reaction product of some or all of the ingredients, or a combination of the foregoing. A condensed description is provided here for convenience and ease of reference.

A catalyst composition can include a lanthanide compound, an alkylating agent, and a compound including a labile halogen atom. Where the lanthanide compound and/or alkylating agent include a labile halogen atom, the catalyst need not include a separate halogen source, i.e., the catalyst may simply include a halogenated lanthanide compound and an alkylating agent. In some embodiments, the alkylating agent can include both an aluminoxane and an alkyl aluminum compound. In other embodiments, a non-coordinating anion or non-coordinating anion precursor may be employed in lieu of a halogen source. Where the alkylating agent includes a hydride compound, the halogen source may include a tin halide as disclosed in U.S. Pat. No. 7,008,899. In these or other embodiments, other organometallic compounds (e.g., a nickel-containing compound, as disclosed in U.S. Pat. No. 6,699,813) or Lewis bases also may be employed. Exemplary catalyst compositions include a lanthanide compound and (a) an alkylating agent and a halogen-containing compound, although use of a halogen-containing compound is optional when the lanthanide compound and/or the alkylating agent contains a halogen atom; (b) an aluminoxane; or (c) an alkylating agent and a non-coordinating anion or precursor thereof.

Various lanthanide compounds or mixtures thereof can be employed. These compounds preferably are soluble in hydrocarbon solvents including aromatic hydrocarbons such as benzene, toluene, xylenes, (di)ethylbenzene, and mesitylene; aliphatic hydrocarbons such as linear and branched $C_5$-$C_{10}$ alkanes, petroleum ether, kerosene, and petroleum spirits; or cycloaliphatic hydrocarbons such as cyclopentane, cyclohexane, methylcyclopentane, and methylcyclohexane; hydrocarbon-insoluble lanthanide compounds can be suspended in the polymerization medium. Mixtures of the foregoing solvents also can be used.

Preferred lanthanide compounds include those which include at least one Nd, La, or Sm atom or those including didymium (a commercial mixture of rare-earth elements obtained from monazite sand). The lanthanide atom in the lanthanide compounds can be in various oxidation states, e.g., 0, +2, +3, and +4. Exemplary lanthanide compounds include carboxylates, organophosphates, organophosphonates, organophosphinates, xanthates, carbamates, dithiocarbamates, β-diketonates, alkoxides, aryloxides, halides, pseudo-halides, oxyhalides. Exemplary lanthanide compounds include, but are not limited to, neodymium carboxylates such as neodymium formate, neodymium acetate, neodymium acetate, neodymium (meth)acrylate, neodymium valerate, etc.; neodymium organophosphates such as various neodymium dialkyl phosphates, neodymium dioleyl phosphate, neodymium diphenyl phosphate, etc.; neodymium organophosphonates such as various neodymium alkyl phosphonates, neodymium oleyl phosphonate, neodymium phenyl phosphonate, etc.; neodymium organophosphinates such as various neodymium(di)alkylphosphinates, neodymium(di)phenylphosphinate, neodymium(p-nonylphenyl)phosphinate, neodymium bis(p-nonylphenyl)phosphinate, etc.; neodymium carbamates such as various neodymium dialkylcarbamates, neodymium dibenzylcarbamate, etc.; neodymium dithiocarbamates such as various neodymium dialkyldithiocarbamates and neodymium dibenzyldithiocarbamate; neodymium xanthates such as various neodymium alkylxanthates, neodymium benzylxanthate, etc.; neodymium β-diketonates such as neodymium acetylacetonate, neodymium trifluoro-acetylacetonate, neodymium hexafluoroacetylacetonate, neodymium benzoylacetonate, neodymium 2,2,6,6-tetramethyl-3,5-heptanedionate, etc.; neodymium alkoxides or aryloxides such as various neodymium alkoxides, neodymium phenoxide, neodymium nonylphenoxide, neodymium naphthoxide, etc.; neodymium halides such as $NdF_3$, $NdCl_3$, $NdBr_3$, and $NdI_3$; neodymium pseudo-halides such as $Nd(CN)_3$, $Nd(OCN)_3$, neodymium thiocyanate, neodymium azide, neodymium ferrocyanide, etc.; and neodymium oxyhalides such as NdOF, NdOCl, NdOBr, etc. (The foregoing list is limited to Nd compounds for the sake of simplicity, but this extensive list easily can be used by the ordinarily skilled artisan to identify and select similar compounds employing other lanthanide metals.)

The lanthanide compound typically is used in conjunction with one or more alkylating agents, i.e., organometallic compounds that can transfer hydrocarbyl groups to another metal; often, these agents are organometallic compounds of electropositive metals such as Groups 1, 2, and 3 (Groups IA, IIA, and IIIA) metals. Common alkylating agents include organoaluminum and organomagnesium compounds, some of which are soluble in the types of hydrocarbon solvents described above. Where the alkylating agent includes a labile halogen atom, the alkylating agent may also serve as the halogen-containing compound.

Organoaluminum compounds include those represented by the formula $AlR_nX_{3-n}$ where each R independently is a monovalent organic group attached to the Al atom via a C atom; each X independently is a H atom, a halogen atom, a carboxylate group, an alkoxide group, or an aryloxide group; and n is an integer of from 1 to 3. Each R can be a hydrocarbyl group (which can contain heteroatoms such as N, O, B, Si, S, and P) such as, but not limited to, (cyclo)alkyl, substituted (cyclo)alkyl, (cyclo)alkenyl, substituted (cyclo)alkenyl, aryl, substituted aryl, aralkyl, alkaryl, allyl, and alkynyl groups.

Organoaluminum compounds include trihydrocarbylaluminum compounds such as various trialkylaluminums, tris(1-methylcyclopentyl)aluminum, triphenylaluminum, tri-p-tolylaluminum, tris(2,6-dimethylphenyl)aluminum, tribenzylaluminum, various dialkylphenylaluminum, various dialkylbenzylaluminums, various alkyldibenzylaluminums, etc.; dihydrocarbylaluminum hydrides such as various dialkylaluminum hydrides, diphenylaluminum hydride, di-p-tolylaluminum hydride, dibenzylaluminum hydride, various phenylalkylaluminum hydrides, various phenyl-n-alkylaluminum hydrides, various phenylisoalkylaluminum hydrides, various p-tolylalkylaluminum hydrides, various benzylalkylaluminum hydrides, etc.; hydrocarbylaluminum dihydrides such as various alkylaluminum dihydrides; dihydrocarbylaluminum chloride compounds such as various dialkylaluminum chlorides, diphenylaluminum chloride, di-p-tolylaluminum chloride, dibenzylaluminum chloride, various phenylalkylaluminum chlorides, various p-tolylalkylaluminum chlorides, various benzylalkylaluminum chlorides, etc.; and hydrocarbylaluminum dichlorides such as various alkylaluminum dichlorides. Other organoaluminum compounds include various dialkylaluminum alkanoates, various alkylaluminum bisalkanoates, various dialkylaluminum alkoxides and phenoxides, various alkylaluminum dialkoxides and diphenoxides, etc.

Also useful are aluminoxanes including oligomeric linear aluminoxanes and oligomeric cyclic aluminoxanes represented by the respective general formulae

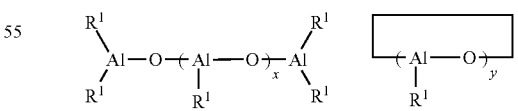

where x can be an integer of from 1 to about 100 or from about 10 to about 50; y may be an integer of from 2 to about 100 or from about 3 to about 20; and each $R^1$ independently may be a monovalent organic group attached to the Al atom via a C atom. Each $R^1$ can be a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups; these hydrocarbyl groups may contain heteroatoms such as those mentioned above. (The number of moles of the aluminoxane as used herein refers to the number of moles of the aluminum atoms rather than the number of moles of the oligomeric aluminoxane molecules.)

Aluminoxanes can be prepared by reacting trihydrocarbylaluminum compounds with water. This reaction can be performed by, e.g., (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Potentially useful aluminoxane compounds include one or more of methylaluminoxane (MAO), modified methylaluminoxane (MMAO, which can be formed by substituting ~20-80% of the methyl groups of MAO with $C_2$-$C_{12}$ hydrocarbyl groups, preferably isobutyl groups), any of a variety of alkylaluminoxanes (particularly isobutylaluminoxane), any of a variety of cycloalkylaluminoxanes, phenylaluminoxane, various alkyl-substituted phenylaluminoxanes, etc.

Useful organomagnesium compounds can be represented by the formula $R_mMgX_{2-m}$ where X is a hydrogen atom, a halogen atom, a carboxylate group, an alkoxide group, or an aryloxide group and each R independently is a monovalent organic group attached to the Mg atom via a C atom. Each R can be a hydrocarbyl group such as, but not limited to, substituted and unsubstituted (cyclo)alkyl, substituted and unsubstituted (cyclo)alkenyl, aryl, allyl, substituted aryl, aralkyl, alkaryl, and alkynyl groups; these hydrocarbyl groups may contain heteroatoms such as those set forth previously. Suitable organomagnesium compounds include various dialkylmagnesiums (particularly dibutylmagnesium), diphenylmagnesium, dibenzylmagnesium, as well as hydrocarbylmagnesium hydrides, halides, carboxylates, alkoxides, aryloxides, and mixtures thereof; various alkylmagnesium hydrides, halides, carboxylates, alkoxides, aryloxides, and mixtures thereof; and various arylmagnesium hydrides, halides, carboxylates, alkoxides, aryloxides, and mixtures thereof.

Various compounds, or mixtures thereof, that contain one or more labile halogen atoms can be employed as the halogen source. These compounds may simply be referred to as halogen-containing compounds. A combination of two or more halogen atoms can also be utilized. Certain halogen-containing compounds can be soluble in a hydrocarbon solvent while others can be suspended in the oligomerization medium to form the catalytically active species. (Where neodymium halides, oxyhalides, or other compounds containing labile halogen atoms are employed, the Nd-containing compound can serve as both the lanthanide compound as well as the halogen-containing compound; a Lewis base such as THF may be employed as an aid for solubilizing this class of neodymium compounds in inert organic solvents.)

Types of halogen-containing compounds include, but are not limited to, elemental halogens, mixed halogens (e.g., ICl, IBr, $ICl_5$, and $IF_5$), hydrogen halides (e.g., HF, HCl, HBr, etc.), organic halides such as various alkyl halides, various allyl halides, various benzyl halides, various halo-diphenylalkanes, various triphenylalkyl halides, various benzylidene halides, various alkyltrichlorosilanes, phenyltrichlorosilane, various dialkyldichlorosilanes, diphenyldichlorosilane, various trialkylchlorosilanes, benzoyl halides, propionyl halides, and methyl haloformates; inorganic halides such as $PCl_3$, $PBr_3$, $PCl_5$, $POCl_3$, $POBr_3$, $BF_3$, $BCl_3$, $BBr_3$, $SiF_4$, $SiCl_4$, $SiBr_4$, $SiI_4$, $AsCl_3$, $AsBr_3$, $AsI_3$, $SeCl_4$, $SeBr_4$, $TeCl_4$, $TeBr_4$, and $TeI_4$; metallic halides such as $SnCl_4$, $SnBr_4$, $AlCl_3$, $AlBr_3$, $SbCl_3$, $SbCl_5$, $SbBr_3$, $AlI_3$, $AlF_3$, $GaCl_3$, $GaBr_3$, $GaI_3$, $GaF_3$, $InCl_3$, $InBr_3$, $InI_3$, $InF_3$, $TiCl_4$, $TiBr_4$, $TiI_4$, $ZnCL_2$, $ZnBr_2$, $ZnI_2$, and $ZnF_2$; organometallic halides such as various dialkylaluminum halides, various alkylaluminum dihalides, various alkylaluminum sesquihalides, various alkylmagnesium halides, various phenylmagnesium halides, various benzylmagnesium halides, various alkyltin trihalides, various dialkyltin dihalides, and various trialkyltin halides; and mixtures thereof.

Non-coordinating anions include bulky anions that do not form coordinate bonds with, for example, the active center of a catalyst system, due to steric hindrance. Non-coordinating anions include tetraarylborate anions (which optionally can be fluorinated), such as tetrakis(pentafluorophenyl)borate. Ionic compounds containing non-coordinating anions are known in the art, and also include a countercation such as a carbonium (e.g., triarylcarbonium), ammonium, or phosphonium cation.

Non-coordinating anion precursors include substances that can form a non-coordinating anion under reaction conditions. Non-coordinating anion precursors include trihaloalkyl boron compounds.

The foregoing catalyst compositions can have high catalytic activity for polymerizing conjugated dienes into stereospecific polydienes over a wide range of catalyst concentrations and catalyst ingredient ratios. The catalyst ingredients can interact to form an active catalyst species, and the optimum concentration for any one ingredient can depend on the concentrations of the other ingredients.

The molar ratio of alkylating agent to lanthanide compound (alkylating agent/Ln) can range from ~1:1 to ~1000:1, from ~2:1 to ~500:1, or from ~5:1 to ~200:1. Where both an alkyl aluminum compound and an aluminoxane are employed as alkylating agents, the molar ratio of alkyl aluminum to lanthanide compound (Al/Ln) can range from ~1:1 to ~200:1, from ~2:1 to ~150:1, or from ~5:1 to ~100:1, and the molar ratio of the aluminoxane to the lanthanide compound (aluminoxane/Ln) can range from ~5:1 to ~1000:1, from ~10:1 to ~700:1, or from ~20:1 to ~500:1. The molar ratio of the halogen-containing compound to the lanthanide compound (halogen atom/Ln) can range from ~1:2 to ~20:1, from ~1:1 to ~10:1, or from ~2:1 to ~6:1.

The molar ratio of non-coordinating anion or non-coordinating anion precursor to lanthanide compound (An/Ln) can range from ~1:2 to ~20:1, from ~3:4 to ~10:1, or from ~1:1 to ~6:1.

The molecular weight of polydienes produced with lanthanide-based catalysts can be controlled by adjusting the amount of catalyst used and/or the amounts of co-catalyst concentrations within the catalyst system; polydienes having a wide range of molecular weights can be produced in this manner. In general, increasing the catalyst and co-catalyst concentrations reduces the molecular weight of resulting polydienes, although very low molecular weight polydienes (e.g., liquid polydienes) require extremely high catalyst concentrations. Typically, this necessitates removal of catalyst residues from the polymer to avoid adverse effects such as retardation of the sulfur cure rate. U.S. Pat. No. 6,699,813 teaches that nickel compounds can be used as very efficient molecular weight regulators. Including one or more Ni-containing compounds to lanthanide-based catalyst compositions advantageously permits easy regulation of the molecular weight of the resulting polydiene without significant negative effects on catalyst activity and polymer microstructure.

Various Ni-containing compounds or mixtures thereof can be employed. The Ni-containing compounds preferably are soluble in hydrocarbon solvents such as those set forth above, although hydrocarbon-insoluble Ni-containing compounds can be suspended in the polymerization medium to form the catalytically active species.

The Ni atom in the Ni-containing compounds can be in any of a number of oxidation states including the 0, +2, +3, and +4 oxidation states, although divalent Ni compounds, where the Ni atom is in the +2 oxidation state, generally are preferred. Exemplary Ni compounds include carboxylates, organophosphates, organophosphonates, organophosphinates, xanthates, carbamates, dithiocarbamates, β-diketonates, alkoxides, aryloxides, halides, pseudo-halides, oxyhalides, organonickel compounds (i.e., compounds containing at least one C—Ni bond such as, for example, nickelocene, decamethylnickelocene, etc.), and the like.

The molar ratio of the Ni-containing compound to the lanthanide compound (Ni/Ln) generally ranges from about 1:1000 to about 1:1, preferably from about 1:200 to about 1:2, and more preferably from about 1:100 to about 1:5.

The catalyst composition may be formed in situ by adding the catalyst ingredients to a solution containing monomer and solvent, or simply bulk monomer, in either a stepwise or simultaneous manner; for example, the alkylating agent can be added first, followed by the lanthanide compound, and then followed by the halogen-containing compound, if used, or by the non-coordinating anion or non-coordinating anion precursor.

Alternatively, the catalyst ingredients can be mixed outside the polymerization system at a temperature of from ~−20° to ~80° C., and the resulting catalyst composition added to the polymerization vessel, optionally after aging for up to a few days.

The catalyst composition also may be formed in the presence of at least one conjugated diene monomer. That is, the catalyst ingredients may be pre-mixed in the presence of a small amount of conjugated diene monomer at a temperature of from ~−20° to ~80° C. The amount of conjugated diene monomer that may be used can range from about 1 to ~500 moles, from ~5 to ~250 moles, or from ~10 to ~100 moles, per mole of the lanthanide compound. The resulting catalyst composition can be aged for a few minutes to a few days prior to being added to the remainder of the conjugated diene monomer.

Alternatively, the catalyst composition may be formed by using a multistage procedure. The first stage can involve combining the alkylating agent with the lanthanide compound in the absence of conjugated diene monomer or in the presence of a small amount of conjugated diene monomer at a temperature of from ~−20° to ~80° C. The foregoing reaction mixture and the halogen-containing compound, non-coordinating anion, or non-coordinating anion precursor can be charged in either a stepwise or simultaneous manner to the remainder of the conjugated diene monomer.

When a solution of the catalyst composition or one or more of the catalyst ingredients is prepared outside the polymerization system, an organic solvent or carrier may be employed. The organic solvent may serve to dissolve the catalyst composition or ingredients, or the solvent may simply serve as a carrier in which the catalyst composition or ingredients may be suspended. The organic solvent may be inert to the catalyst composition. Useful solvents include those described previously.

Production of polymer can be accomplished by polymerizing conjugated diene(s) in the presence of a catalytically effective amount of the foregoing catalyst composition. The total catalyst concentration to be employed in the polymerization mass may depend on the interplay of various factors such as the purity of the ingredients, polymerization temperature, polymerization rate and conversion desired, desired molecular weight, and the like. Thus, a specific total catalyst concentration cannot be definitively set forth except to say that catalytically effective amounts of the respective catalyst ingredients can be used. The amount of the lanthanide compound used can be varied from ~0.01 to ~2 mmol, from ~0.02 to ~1 mmol, or from ~0.05 to ~0.5 mmol, per 100 g of conjugated diene monomer.

Production of cis-1,4-polydiene is accomplished by polymerizing conjugated diene monomer(s) in the presence of a catalytically effective amount of a catalyst composition. The total catalyst concentration to be employed in the polymerization mass depends on the interplay of various factors such as the purity of the ingredients, the polymerization temperature, the polymerization rate and conversion desired, the molecular weight desired, and many other factors; accordingly, a specific total catalyst concentration cannot be definitively set forth except to say that catalytically effective amounts of the respective catalyst ingredients should be used. The amount of the lanthanide compound used generally ranges from ~0.01 to ~2 mmol, preferably from ~0.02 to ~1 mmol, and more preferably from ~0.05 to ~0.5 mmol per 100 g conjugated diene monomer. All other ingredients generally are added in amounts that are based on the amount of lanthanide compound (see the various ratios set forth previously).

Polymerization can be carried out in an organic solvent as the diluent. Both the monomer to be polymerized and the polymer formed are soluble in the polymerization medium. Alternatively, a precipitation polymerization system may be employed by choosing a solvent in which the polymer formed is insoluble. In both cases, the monomer to be polymerized may be in a condensed phase. Also, the catalyst ingredients may be solubilized or suspended within the organic solvent; here and in other embodiments, the catalyst ingredients or components are unsupported or not impregnated into a catalyst support. In other embodiments, the catalyst ingredients or components may be supported.

In performing these polymerizations, an amount of organic solvent in addition to the amount of organic solvent that may be used in preparing the catalyst composition may be added to the polymerization system. The additional organic solvent may be the same as or different from the organic solvent used in preparing the catalyst composition. An organic solvent that is inert with respect to the catalyst composition employed to catalyze the polymerization may be selected. Exemplary hydrocarbon solvents have been set forth above. When a solvent is employed, the concentration of the monomer to be polymerized may not be limited to a special range. In one or more embodiments, however, the concentration of the monomer present in the polymerization medium at the beginning of the polymerization can range from ~3 to ~80% by weight, from ~5 to ~50% by weight, or from ~10 to ~30% by weight.

(Polymerization of conjugated dienes may also be carried out by means of bulk polymerization, which refers to a polymerization environment where substantially no solvents are employed, either in a condensed liquid phase or in a gas phase. Polymerization of conjugated dienes also may be carried out as a batch process, a continuous process, or a semi continuous process.)

Regardless of whether a batch, continuous, or semi-continuous process is employed, the polymerization preferably is conducted with moderate to vigorous agitation under anaerobic conditions provided by an inert protective gas such as $N_2$, Ar or He. The polymerization temperature may vary widely, although typically a temperature of from about 20° to about 90° C. is employed; heat can be removed by external cooling and/or cooling by evaporation of the monomer or the solvent. The polymerization pressure employed may vary widely, although typically a pressure of from about 0.1 to about 1 MPa is employed.

The cis-1,4-polydienes resulting from the preceding polymerization process have a linear backbone structure and exhibit good green strength and excellent viscoelastic properties. The linear backbone structure is believed to provide better tensile properties, higher abrasion resistance, lower hysteresis loss, and outstanding fatigue resistance in rubber compounds. Accordingly, these cis-1,4-polydienes are particularly suitable for use in providing tire components such as sidewall and tread.

Where 1,3-butadiene is polymerized according to the foregoing process, the cis-1,4-polybutadiene generally has a number average molecular weight (MO, as determined by GPC using polystyrene standards, such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75. Exemplary $M_n$ values range from ~5000 to ~200,000, commonly from ~25,000 to ~150,000, and typically from ~50,000 to ~125,000. The polydispersity of these polymers generally ranges from ~1.5 to ~5.0, typically from ~2.0 to ~4.0.

Resulting polydienes advantageously can have a cis-1,4-linkage content of at least ~60%, at least about ~75%, at least about ~90%, and even at least about ~95%, and a 1,2-linkage content of less than ~7%, less than ~5%, less than ~2%, and even less than ~1%.

Although an exemplary embodiment of this process involves polymerization of 1,3-butadiene into cis-1,4-polybutadiene, other conjugated dienes such as those set forth above also can be polymerized to give polymers with a predominantly cis-1,4 microstructure. Further, two or more conjugated dienes can be polymerized into copolymers having an essentially cis-1,4 microstructure.

Regardless of the particular type of polymerization employed, after a desired degree of conversion has been reached, the heat source (if used) can be removed and, if the reaction vessel is to be reserved solely for polymerizations, the reaction mixture removed to a post-polymerization vessel for further processing. At this point, the reaction mixture commonly is referred to as a "polymer cement" because of its relatively high concentration of polymer.

Both of the described polymerization processes advantageously result in polymer chains that possess reactive (living or pseudo-living) terminals. Prior to being quenched, the polymer chains in the polymer cement can undergo further reactions so as to be provided with terminal functionality. As described above, functionalization can enhance the interaction between the polymer and particulate fillers in rubber compounds, thereby improving the mechanical and dynamic properties of the resulting vulcanizates.

In one aspect, the polymer (regardless of type) can include a moiety, preferably directly bonded to the polymer, which includes an amine group and at least one other heteroatom-containing group. This polymer, hereinafter referred to as the functionalized polymer, can be provided by reacting a terminally active polymer with a compound that includes a ring system which includes at least two heteroatoms selected from O, P, S and N and at least one >C=N— segment; the N atom of the segment can constitute one of the at least two heteroatoms. The ring system can include two or more >C=N— segments, which can be in the same or different rings of the ring system.

Where the ring system includes more than one ring, the some or all of the rings can be fused or can be bonded to one another. Each of the rings includes at least some unsaturation, and some or all of the rings can be aromatic. Some or all of the rings can be 5- or 6-membered.

Examples of compounds that can provide the desired functionality include, but are not limited to, those having the following structures:

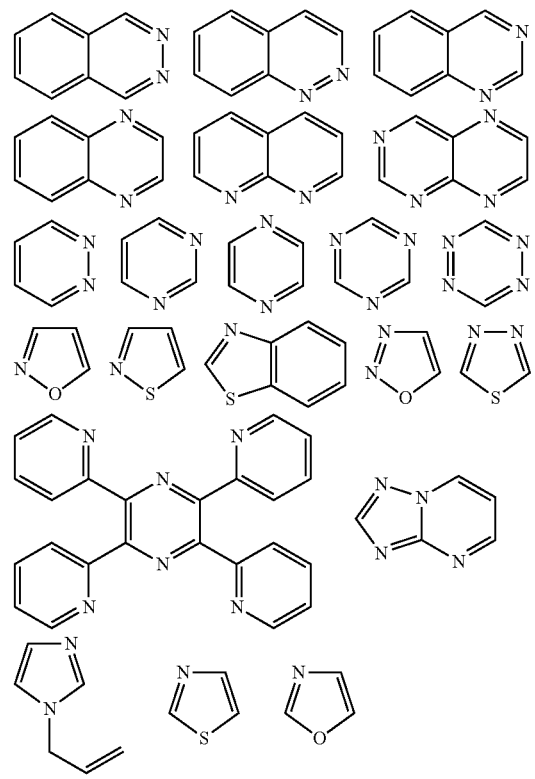

From these, the ordinarily skilled artisan can envision additional examples.

Reaction of this type of compound with a terminally active polymer typically occurs between a C atom of the polymer chain and the C atom of the double bond of a >C=N— segment of the ring system. Where the compound includes more than one >C=N— segment, more than one polymer chain can react and attach to the radical, resulting in a multi-arm macromolecule. The number of arms in such a macromolecule and/or the relative percentage of such macromolecules can be controlled by varying the molar ratio of functionalizing compound to terminally reactive polymer chains. This type of multi-arm macromolecule typically exhibits resistance to cold flow, which often translates into desirable storage and processing characteristics.

In another aspect, a pseudo-living polymer can be provided with a moiety defined by formula (I). A convenient manner of providing such a group to the polymer is through introduction of one or more hydrazine functionalities. One technique for providing hydrazine functionality is to react a pseudo-living polymer, preferably one involving a high degree of 1,4-linkages, with one or more hydrazones.

Several hydrazones are commercially available but, if desired or necessary, can be formed by condensing an aldehyde or ketone with a compound containing a >N—NH$_2$ group, typically at a 1:1 molar ratio in a suitable solvent; moderate temperatures (e.g., about 10° to about 60° C., often about 20° to about 50° C.) typically are sufficient to allow for fairly complete reaction within a reasonable amount of time (e.g., a few hours). Isolation and purification of the hydrazone can be accomplished by standard procedures such as vacuum distillation, column chromatography, and the like.

Compounds containing a >N—NH$_2$ group include those represented by the general formula $$R'R''N—NH_2 \quad (II)$$

where R' and R'' are defined as above in connection with formula (I). Examples of such materials include, but are not limited to, 1,1-dimethylhydrazine, 1,1-diethylhydrazine, 1-methyl-1-ethylhydrazine, 1-methyl-1-phenylhydrazine, etc., as well as amino-substituted heterocyclic compounds such as 1-aminopiperidine, 1-aminopiperazine, 1-amino-4-methylpiperazine, 1-aminopyrrolidine, 1-aminohomopiperidine (i.e., N-aminohexamethyleneimine), 1-aminopyridinium and the like, and similar piperidines and piperazines that include substitution at one or more ring carbon atoms. In certain embodiments, amino-substituted heterocyclic compounds, particularly 1-aminopyrrolidine, 1-aminopiperidine, and 1-aminohomopiperidine, can be preferred.

The condensation reaction employed to form the hydrazone can employ a ketone or an aldehyde. The following discussion focuses on aldehydes, but the ordinarily skilled artisan easily can extend the teaching so as to provide a similar list of ketones.

Aldehydes that can be used in forming useful hydrazones are not particularly limited from a structural perspective. Non-limiting examples of potentially useful aldehydes include formaldehyde; alkyl aldehydes such as ethanal (acetaldehyde), propanal (propionaldehyde), butanal (butyraldehyde), pentanal (valeraldehyde), hexanal (caproaldehyde), heptanal, octanal, etc.; cycloalkanecarboxaldehydes such as cyclopentanecarboxaldehyde, cyclohexanecarboxaldehyde, cycloheptanecarboxaldehyde, cyclooctanecarboxaldehyde, etc.; aromatic compounds with aldehyde functionality such as benzaldehyde and any of a variety of substituted benzaldehydes including, but not limited to, 2-, 3-, or 4-dimethylaminobenzaldehyde; heterocyclic compounds with aldehyde functionality such as 2-, 3-, or 4-pyridine carboxaldehyde, 2- or 3-pyrrole carboxaldehyde, 2- or 3-furaldehyde, N-methylpyrrole-2-carboxaldehyde, and N-methylimidazole-2-carboxaldehyde; and metallocene aldehydes such as ferrocenecarboxaldehyde. In certain embodiments, hydrazones made from alkyl aldehydes, particularly propanal and butanal, and cycloalkanecarboxaldehydes, particularly cyclohexanecarboxaldehyde, can be preferred.

Exemplary hydrazones can be described by the general formula

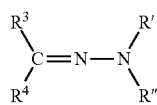

(III)

where R' and R'' are as defined above in connection with formula (I) and each of R$^3$ and R$^4$ independently is H or a substituted or unsubstituted alkyl, alkenyl, cycloalkyl, cycloalkenyl, aryl, allyl, aralkyl, alkaryl, or alkynyl group, or R$^3$ and R$^4$ together form a substituted or unsubstituted alkylene, alkenylene, cycloalkylene, cycloalkenylene, or arylene group.

Preferred hydrazones include those that result from the condensation of an amino-substituted heterocyclic compound, particularly 1-aminopiperidine, 1-aminopyrrolidine, or 1-aminohomopiperidine, and an alkyl aldehyde, particularly C$_2$-C$_6$ alkyl aldehydes such as propanal and butanal, or a cycloalkanecarboxaldehyde, particularly cyclohexanecarboxaldehyde. Representative hydrazones in this class are N-(cyclohexylmethylidene)-1-piperidinylamine and N-(benzylidene)-(4-methyl-1-piperazinyl)amine.

A hydrazone radical can be provided as a terminal moiety by functionalizing a polymer prior to quenching, advantageously when it is in the aforementioned polymer cement state. One method of effecting this functionalization involves introducing to the polymer cement one or more hydrazones and allowing such hydrazone(s) to react at the pseudo-living terminus of the polymer. The carbon atom of the >C=N—N< group from the hydrazone is believed to add to the pseudo-living polymer chain which results, after quenching with an active hydrogen-containing compound (e.g., water, an alcohol, an acid, etc.), in a terminal moiety represented by the formula —NH—NR'R'' (formula I) where R' and R'' each independently is a substituted or unsubstituted (cyclo)alkyl, (cyclo)alkenyl, aryl, allyl, aralkyl, alkaryl, or alkynyl group, or together form a substituted or unsubstituted alkylene, alkenylene, cycloalkylene, cycloalkenylene, or arylene group. (In the foregoing, the terms substituted cycloalkylene and cycloalkenylene embody such heterocyclic moieties as morpholine and derivatives thereof, N-alkyl-piperazines, pyridines, and the like.) One exemplary terminal moiety is —NH-Pip where Pip represents piperidinyl functionality (which can be provided from a compound of general formula (II) with R' and R'' together constituting a 5-carbon alkylene group). In certain embodiments, providing this functionality from one of the previously described preferred hydrazones can result in polymers that display particularly advantageous properties when compounded with, inter alia, reinforcing fillers such as carbon black.

Although certainly not required, a terminal moiety such as that represented by formula (I) can be converted to primary amine functionality through use of a reducing agent such as, e.g., any of a variety of metals (notably zinc, particularly under acidic conditions) or Na$_2$S$_2$O$_4$.

Either of the foregoing functionalization reactions can be performed relatively quickly (a few minutes to a few hours) at moderate temperatures (e.g., 0° to 75° C.).

Although typically not required, a quenching agent can be added to the polymer cement to inactivate any residual reactive polymer chains and the catalyst composition. The quenching agent may be one or more protic compounds such as, for example, alcohols, carboxylic acids, inorganic acids, water, and the like. The polymer and quenching agent can be stirred for up to about 120 minutes at temperatures of from ~25° to ~150° C.

An antioxidant may be added before, with, or after the quenching agent. The amount of the antioxidant employed can range from ~0.2 to ~1% by weight of the polymer product.

Functionalized polymer can be isolated from the polymerization mixture by conventional techniques such as drum drying, extruder drying, vacuum drying or the like, which may be combined with coagulation with water, alcohol or steam. If coagulation is performed, oven drying may be desirable.

Prior to processing, stored synthetic rubber (regardless of form such as, e.g., slab, wigwag, etc.) preferably resists flow, i.e., exhibits good cold-flow resistance. However, when blended or milled with other ingredients during compounding (as discussed in detail below) at elevated temperatures, resistance to flow no longer necessarily is desirable, i.e., an excessive resistance to flow can compromise or hinder processability. A synthetic rubber with a good balance of these properties is desirable.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from about 32 to about 400 $m^2/g$, about 100 to about 250 $m^2/g$, and about 150 to about 220 $m^2/g$.

The pH of the silica filler is generally from about 5 to about 7 or slightly over, preferably from about 5.5 to about 6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of ~1 to ~100 phr, preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least ~20 $m^2/g$, preferably at least ~35 $m^2/g$, are preferred; surface area values can be determined by ASTM D-1765 using the CTAB technique. The carbon blacks may be in pelletized form or an unpelletized flocculent mass, although the former type can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents can have a general formula of A-T-Q, in which A represents a functional group capable of bonding physically and/or chemically with a group on the surface of the silica filler (e.g., surface silanol groups); T represents a hydrocarbon group linkage; and Q represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorgano-siloxanes bearing the Q and A functionalities mentioned above. An exemplary coupling agent is bis[3-(triethoxysilyl)propyl]tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Additional fillers can be utilized in an amount of up to ~40 phr, typically up to ~20 phr.

Other rubber additives such as process oils, plasticizers, anti-degradants (e.g., antioxidants and antiozonants), curing agents and the like also can be employed.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with ~0.2 to ~5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-

468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Commercially available reagents and starting materials included the following, all of which were acquired from Sigma-Aldrich Co. (St. Louis, Mo.) and used without further purification unless otherwise noted in a specific example: phthalazine (98% purity), pyridazine (98% purity), pyrimidine (99% purity), and 1,3,5-triazine (97% purity).

For Examples 1-9, butadiene solution (in hexane), styrene solution (33% in hexane), hexane, n-butyllithium (1.60 M in hexane), 2,2-bis(2'-tetrahydrofuryl)propane (1.60 M solution in hexane, stored over $CaH_2$), and butylated hydroxytoluene (BHT) solution in hexane were used.

Examples 1-3

To a $N_2$-purged reactor equipped with a stirrer was added 1.62 kg hexane, 0.41 kg styrene solution, and 2.45 kg butadiene solution (22.2% by wt. in hexane). The reactor was charged with 3.27 mL n-butyllithium, followed by 1.0 mL 2,2-bis(2'-tetrahydrofuryl)-propane solution. The reactor jacket was heated to 50° C. and, after ~27 minutes, the batch temperature peaked at ~61° C.

After an additional ~30 minutes, polymer cement was transferred from the reactor to dried glass vessels. A control (example 1) was terminated with isopropanol. Two others were functionalized with phthalazine solution (1.0 M in toluene/THF), one at molar ratio of functionalizing agent-to-initiator of 1:2 (example 2) and another at a molar ratio of 1:1 (example 3). The three vessels were placed in a 50° C. bath for ~30 minutes.

The samples then were quenched by addition of ~1.5 mL isopropanol prior to addition of 3 mL of di-t-butyl-p-cresol antioxidant solution (2% by wt. in hexane). All samples were coagulated in isopropanol containing BHT and drum dried.

Properties of these polymers are summarized below in Table 1.

Examples 4-6

To a $N_2$-purged reactor equipped with a stirrer was added 1.31 kg hexane, 0.41 kg styrene solution, and 2.76 kg butadiene solution (19.7% by wt. in hexane). The reactor was charged with 3.0 mL n-butyllithium, followed by 1.1 mL 2,2-bis(2'-tetrahydrofuryl)-propane solution. The reactor jacket was heated to 50° C. and, after ~25 minutes, the batch temperature peaked at ~64° C.

After an additional ~30 minutes, polymer cement was transferred from the reactor to dried glass vessels. A control (example 4) was terminated with isopropanol. Two others were functionalized with pyridazine solution (1.0 M in toluene), one at molar ratio of functionalizing agent-to-initiator of 1:2 (example 5) and another at a molar ratio of 1:1 (example 6). The three vessels were placed in a 50° C. bath for ~30 minutes.

The samples then were quenched by addition of ~1.5 mL isopropanol prior to addition of 3 mL of di-t-butyl-p-cresol antioxidant solution (2% by wt. in hexane). All samples were coagulated in isopropanol containing BHT and drum dried.

Properties of these polymers, along with those from examples 1-3, are summarized below, where $M_p$ represents peak molecular weight.

TABLE 1

Properties of polymers from Examples 1-6

| | 1 | 2 | 3 | 4 | 5 | 6 |
|---|---|---|---|---|---|---|
| $M_n$ (kg/mol) | 125.0 | 126.9 | 126.6 | 136.5 | 170.4 | 137.2 |
| $M_w/M_n$ | 1.04 | 1.04 | 1.05 | 1.05 | 1.20 | 1.05 |
| $M_p$ (kg/mol) | 130.3 | 131.9 | 130.0 | 142.9 | 144.1 | 143.0 |
| $T_g$ (° C.) | −37.9 | −37.0 | −38.1 | −35.7 | −36.3 | −36.2 |
| $ML_{1+4}$ @ 100° C. | 16.7 | 18.0 | 18.1 | — | — | — |
| % coupling | — | — | — | 0 | 38.1 | 0 |

Examples 7-9

The polymers from Examples 1-3 were used to make filled compositions, employing the formulation shown in Table 2 (carbon black as sole particulate filler) where N-phenyl-N'-(1,3-dimethylbutyl)-p-phenyldiamine is an antioxidant and N-t-butylbenzothiazole-2-sulfenamide, 2,2'-dithiobisbenzothiazole and N,N'-diphenylguanidine are accelerators.

TABLE 2

Composition for vulcanizates, SBR

| | Amount (phr) |
|---|---|
| Masterbatch | |
| synthesized polymer | 100 |
| carbon black (N343 type) | 50 |
| wax | 2 |
| N-phenyl-N'-(1,3-dimethylbutyl)-p-phenyldiamine | 0.95 |
| stearic acid | 2 |
| oil (low PCA content) | 10 |
| Final | |
| sulfur | 1.5 |
| ZnO | 2.5 |
| N-t-butylbenzothiazole-2-sulfenamide | 0.5 |
| 2,2'-dithiobisbenzothiazole | 0.5 |
| N,N'-diphenylguanidine | 0.3 |
| TOTAL | 174.65 |

Compounds were cured for ~15 minutes at 171° C. Results of physical testing on these compounds are shown below in Table 3.

Results of physical testing on vulcanizates made from these polymers are summarized below in Table 3. For the "Temp. sweep" line, the top row of data are from measurements at 0° C. while the bottom row are from measurements at 60° C.

Mooney viscosity ($ML_{1+4}$) values were determined with an Alpha Technologies™ Mooney viscometer (large rotor) using a one-minute warm-up time and a four-minute running time; tensile mechanical properties were determined using the standard procedure described in ASTM-D412; Payne effect (ΔG', i.e., the difference between G' at 0.25% strain and at 14% strain) and hysteresis (tan δ) data were obtained from dynamic experiments conducted at 60° C. and 10 Hz (strain sweep) and 2% strain and 10 Hz (temperature sweep). With respect to tensile properties, $M_x$ is modulus at x % elongation, $T_b$ is tensile strength at break, and $E_b$ is percent elongation at break.

Data corresponding to "Dispersion index" (DI) were calculated using the equation $DI=100-\exp[A\times\log_{10}(F^2H)+B]$, where F is the number of roughness peaks/cm, H is the average roughness peak height, and A and B are constants from Method B in ASTM-D 2663-89. The F and H contour data were acquired by analyzing cut samples (~3.5×2×0.2 cm) with a Surfanalyzer™ profilometer (Mahr Federal Inc.; Providence, R.I.), using the procedure described in Method C (from ASTM-D 2663-89).

TABLE 3

Compound and vulcanizate properties

|  | 7 | 8 | 9 |
|---|---|---|---|
| synthetic polymer (sample no.) | 1 | 2 | 3 |
| DI | 96.8 | 96.2 | 92.5 |
| MDR2000 @ 171° C. (final) | | | |
| ML (kg-cm) | 1.14 | 0.99 | 1.01 |
| MH (kg-cm) | 18.49 | 18.26 | 17.95 |
| MH − ML (kg-cm) | 17.35 | 17.27 | 16.94 |
| $t_{90}$ (min) | 6.91 | 6.12 | 6.01 |
| $ML_{1+4}$ @ 100° C. (final) | 56.4 | 59.2 | 63.2 |
| Tensile @ 23° C. (final, unaged) | | | |
| $M_{50}$ (MPa) | 1.74 | 1.88 | 1.80 |
| $M_{300}$ (MPa) | 12.91 | 15.05 | 16.07 |
| $T_b$ (MPa) | 19.6 | 20.3 | 22.6 |
| $E_b$ (%) | 423 | 384 | 394 |
| Tensile @ 100° C. (final, unaged) | | | |
| $M_{50}$ (MPa) | 1.29 | 1.52 | 1.54 |
| $M_{200}$ (MPa) | 6.20 | 7.62 | 7.88 |
| $T_b$ (MPa) | 7.6 | 9.3 | 9.0 |
| $E_b$ (%) | 233 | 230 | 217 |
| Strain sweep (60° C., 10 Hz, final) | | | |
| G' @ 5% strain (MPa) | 2.976 | 2.296 | 2.118 |
| G" @ 5% strain (MPa) | 0.661 | 0.327 | 0.233 |
| tan δ @ 5% strain | 0.2223 | 0.1423 | 0.1102 |
| ΔG' (MPa) | 3.570 | 1.070 | 0.610 |
| Temp. sweep (2% strain, 10 Hz, final) | | | |
| G' (MPa) | 14.767 | 12.240 | 9.745 |
|  | 5.715 | 4.986 | 4.181 |
| G" (MPa) | 5.703 | 4.851 | 3.796 |
|  | 1.192 | 0.882 | 0.607 |
| tan δ | 0.3852 | 0.3934 | 0.3863 |
|  | 0.2085 | 0.1768 | 0.1451 |
| Peak tan δ | 0.7940 | 0.8335 | 0.8999 |
| $T_g$ (° C.) | −22.5 | −22.9 | −23.2 |

While the data of Table 3 includes much of interest, one line of particular interest is the 60° C. strain sweep tan δ data, where vulcanizates employing styrene/butadiene interpolymers having terminal phthalazine radicals (1:1 molar ratio relative to initiator) are seen to exhibit significant reductions (greater than 50%) in tan δ compared to a vulcanizate employing a control SBR.

Example 10

A preformed catalyst was prepared by mixing 8.08 mL 4.32 M methylaluminoxane in toluene, 1.66 g 1,3-butadiene solution (20.6% by wt. in hexane), 0.65 mL 0.537 M neodymium versatate in cyclohexane, 7.33 mL 1.0 M diisobutylaluminum hydride in hexane, and 1.40 ml 1.0 M diethylaluminum chloride in hexane. The catalyst was aged for 15 min.

To a reactor equipped with turbine agitator blades were added 1.38 kg hexane, 3.08 kg 1,3-butadiene solution (20.6% by wt. in hexane), and the aforementioned catalyst. The reactor jacket temperature was set to 65° C. and, ~45 minutes after addition of catalyst, the polymerization mixture was cooled to room temperature.

The resulting polymer cement was coagulated with 12 L isopropanol containing 5 g 2,6-di-tert-butyl-4-methylphenol and then drum dried. The properties of this polymer are summarized in Table 5 below.

Example 11

A preformed catalyst was prepared by mixing 6.10 mL 4.32 M methylaluminoxane in toluene, 1.27 g 1,3-butadiene solution (22.4% by wt. in hexane), 0.49 mL 0.537 M neodymium versatate in cyclohexane, 5.53 mL 1.0 M diisobutylaluminum hydride in hexane, and 1.05 mL 1.0 M diethylaluminum chloride in hexane. The catalyst was aged for 15 min.

To a reactor equipped with turbine agitator blades were added 1.63 kg hexane, 2.84 kg 1,3-butadiene solution (22.4% by wt. in hexane), and the aforementioned catalyst. The reactor jacket temperature was set to 65° C. and, ~72 minutes after addition of catalyst, the polymerization mixture was cooled to room temperature.

The resulting polymer cement was coagulated and drum dried similarly to the polymer from example 10. The properties of this polymer also are summarized in Table 5.

Examples 12-13

To a reactor equipped with turbine agitator blades were added 1.60 kg hexane and 2.86 kg 1,3-butadiene solution (22.2% by wt. in hexane), and the preformed catalyst from example 10. The reactor jacket temperature was then set to 65° C. and, ~55 minutes after addition of catalyst, the polymerization mixture was cooled to room temperature.

Portions of the resulting polymer cement were transferred to $N_2$-purged bottles and functionalized as shown in Table 4.

TABLE 4

|  | Amount of polymer cement (g) | Functionalizing compound (in toluene) |
|---|---|---|
| Example 12 | 360 | 2.69 mL 0.561M pyrimidine |
| Example 13 | 363 | 2.69 mL 0.566M 1,3,5-triazine |

The bottles were tumbled for 30 minutes in a water bath maintained at 65° C.

The resulting mixture was coagulated with 3 L isopropanol containing 0.5 g 2,6-di-tert-butyl-4-methylphenol and then drum dried. The properties of the resulting polymers are summarized in the following table. (Mooney viscosity ($ML_{1+4}$) values were determined with a Monsanto™ Mooney viscometer (large rotor) using a one-minute warm-up time and a four-minute running time; molecular weights were determined by GPC using polystyrene standards; and 1,2-, cis 1,4-, and trans 1,4-linkage contents were determined from IR spectroscopic analysis.)

TABLE 5

Properties of polymers from Examples 10-13

|  | 10 | 11 | 12 | 13 |
|---|---|---|---|---|
| $M_n$ (kg/mol) | 111.8 | 130.7 | 138.4 | 112.0 |
| $M_w/M_n$ | 1.87 | 1.99 | 1.83 | 1.98 |

TABLE 5-continued

Properties of polymers from Examples 10-13

|  | 10 | 11 | 12 | 13 |
|---|---|---|---|---|
| $ML_{1+4}$ @ 100° C. | 26.5 | 44.2 | 30.6 | 34.6 |
| cis 1,4-linkage content (%) | 94.4 | 95.0 | 94.4 | 94.4 |
| trans 1,4-linkage content (%) | 5.1 | 4.5 | 5.0 | 5.0 |
| 1,2-linkage content (%) | 0.5 | 0.5 | 0.6 | 0.6 |

Examples 14-17

The polymers from examples 10-13 were used to make filled compositions, employing the formulation shown in Table 6 (carbon black as sole particulate filler).

TABLE 6

Composition for vulcanizates, BR

|  | Amount (phr) |
|---|---|
| synthesized polymer | 80 |
| polyisoprene | 20 |
| carbon black (N339 type) | 50 |
| naphthenic oil | 10 |
| wax | 2 |
| antioxidant | 1 |
| ZnO | 2.5 |
| stearic acid | 2 |
| accelerators | 1.3 |
| sulfur | 1.5 |
| Total | 170.3 |

Mooney viscosity ($ML_{1+4}$) values for the filled compositions were determined at 130° C. using an Alpha Technologies™ Mooney viscometer (large rotor) using a one-minute warm-up time and a four-minute running time.

Compounds were cured for ~15 minutes at 171° C. Tensile mechanical properties of vulcanizates were determined using the standard procedure described in ASTM-D412, while Payne effect ($\Delta G'$, i.e., the difference between G' at 0.1% strain and at 20% strain) and hysteresis (tan $\delta$) data were obtained from dynamic strain sweep experiments conducted at 50° C. and 1 Hz.

Results of testing on the compounds and vulcanizates are provided below in Table 7.

TABLE 7

Compound and vulcanizate properties

| Polymer (Ex. no.) | $ML_{1+4}$ @ 130° C. | $T_b$ @ 23° C. (MPa) | $E_b$ @ 23° C. (%) | $\Delta G'$ (MPa) | tan $\delta$ @ 3% strain |
|---|---|---|---|---|---|
| 14 | 10 | 49.6 | 13.2 | 368 | 2.46 | 0.132 |
| 15 | 11 | 65.7 | 13.9 | 340 | 2.12 | 0.118 |
| 16 | 12 | 59.3 | 13.4 | 354 | 1.91 | 0.111 |
| 17 | 13 | 53.0 | 13.6 | 362 | 1.71 | 0.116 |

The data from Table 7 show, inter alia, that vulcanizates employing functionalized cis-1,4-polybutadienes (pyrimidine and 1,3,5-triazine radicals in examples 16 and 17, respectively) exhibit significant reductions in tan $\delta$ at 50° C. (indicative of reductions in hysteresis) and lower $\Delta G'$ (indicative of enhanced interaction between polymer and carbon black particles) compared to vulcanizates employing unmodified cis-1,4-polybutadiene control polymers (examples 14 and 15).

Example 18

Synthesis of cis-1,4-polybutadiene (Unmodified)

To a reactor equipped with turbine agitator blades were added 1.403 kg hexane and 3.083 kg of a 20.6% (by wt.) solution of 1,3-butadiene in hexane.

A preformed catalyst was prepared by mixing 7.35 mL of 4.32 M methylaluminoxane in toluene, 1.66 g of the foregoing butadiene solution, 0.59 mL of 0.537 M neodymium versatate in cyclohexane, 6.67 mL of 1.0 M diisobutylaluminum hydride in hexane, and 1.27 mL of 1.0 M diethylaluminum chloride in hexane. The catalyst was aged for ~15 minutes prior to being charged to the reactor.

The reactor jacket temperature was set to 65° C. and, ~53 minutes after catalyst addition, the polymerization mixture was cooled to room temperature. The resulting polymer cement was coagulated with 12 L isopropanol containing 5 g 2,6-di-tert-butyl-4-methylphenol and then drum dried.

Example 19

Synthesis of second cis-1,4-polybutadiene (Unmodified)

The process of Example 18 was essentially repeated with the amounts of reactants and catalyst components employed being summarized in the following table.

TABLE 8

|  | Amounts |
|---|---|
| Monomer and solvent |  |
| hexane | 1.651 kg |
| 22.4% (by wt.) 1,3-butadiene in hexane | 2.835 kg |
| Catalyst ingredients |  |
| 4.32M methylaluminoxane in toluene | 6.10 mL |
| 22.4% (by wt.) 1,3-butadiene in hexane | 1.27 g |
| 0.537M neodymium versatate in cyclohexane | 0.49 mL |
| 1.0M diisobutylaluminum hydride in hexane | 5.53 mL |
| 1.0M diethylaluminum chloride in hexane | 1.05 mL |

About 72 minutes after catalyst addition, the polymerization mixture was cooled to room temperature. The resulting polymer cement was coagulated and drum dried similarly to the one from Example 18.

Properties of the control polymers from Examples 18 and 19 are compiled in Table 10 below.

Examples 20-21

Modified cis-1,4-polybutadienes

The process from Examples 18-19 was essentially repeated. To the reactor was added 1.593 kg hexane and 2.873 kg of a 22.1% (by wt.) solution of 1,3-butadiene in hexane.

A preformed catalyst was prepared and aged as set forth in Example 18, with the exception that the butadiene component was 1.55 g of a 22.1% (by wt.) solution in hexane.

The reactor jacket temperature was set to 65° C. and, ~60 minutes after catalyst addition, the polymerization mixture was cooled to room temperature.

Portions of the polymer cement were transferred to two $N_2$-purged bottles and reacted with different functionalizing compounds. Details are set forth in the following table.

TABLE 9

|  | Amount of polymer cement | How functionalized |
|---|---|---|
| Example 20 | 427 g | 1.79 mL 1.00M benzaldehyde dimethylhydrazone in hexane |
| Example 21 | 417 g | 1.75 mL 1.00M N-benzylidene-(4-methyl-1-piperazinyl)amine in toluene |

Each bottle was tumbled for ~30 minutes in a water bath maintained at 65° C. The contents of each bottle was coagulated with 3 L isopropanol containing 0.5 g 2,6-di-tert-butyl-4-methylphenol and then drum dried.

The properties of the polymers prepared in Examples 18-21 are set forth in tabular form below. Gum Mooney viscosity ($ML_{1+4}$) values were determined with a Monsanto™ Mooney viscometer (large rotor) using a one-minute warm-up time and a four-minute running time; molecular weights were determined by GPC using polystyrene standards; and 1,2-, cis 1,4- and trans 1,4-linkage contents were determined from IR spectroscopic analysis.

TABLE 10

Properties of polymers from Examples 18-21

|  | 18 | 19 | 20 | 21 |
|---|---|---|---|---|
| $M_n$ (kg/mol) | 116.9 | 130.7 | 121.2 | 105.5 |
| $M_w/M_n$ | 1.86 | 1.99 | 1.81 | 1.95 |
| Gum $ML_{1+4}$ @ 100° C. | 29.4 | 44.2 | 33.9 | 29.9 |
| cis 1,4-linkage content (%) | 94.5 | 95.0 | 94.7 | 94.7 |
| trans 1,4-linkage content (%) | 5.0 | 4.5 | 4.8 | 4.7 |
| 1,2-linkage content (%) | 0.5 | 0.5 | 0.5 | 0.6 |

Examples 22-25

Preparation and Testing of Vulcanizates

Using the formulation set forth below, filled compounds were prepared from the polybutadienes from Examples 18-21.

TABLE 11

Composition for filled compounds

| Ingredient | Amount (phr) |
|---|---|
| synthesized cis-1,4-polybutadiene | 80 |
| polyisoprene | 20 |
| carbon black (N339 type) | 50 |
| naphthenic oil | 10 |
| wax | 2 |
| antioxidant | 1 |
| ZnO | 2.5 |
| stearic acid | 2 |

TABLE 11-continued

Composition for filled compounds

| Ingredient | Amount (phr) |
|---|---|
| accelerators | 1.3 |
| sulfur | 1.5 |
| Total | 170.3 |

Mooney viscosity ($ML_{1+4}$) values were determined at 130° C. with an Alpha Technologies™ Mooney viscometer (large rotor) using a 1-minute warm-up time and a 4-minute running time.

All compounds were cured for ~15 minutes at 171° C. Tensile mechanical properties of the vulcanizates were determined using the standard procedure described in ASTM-D412. Payne effect ($\Delta G'$) and hysteresis (tan δ) data were obtained from a dynamic strain sweep experiment conducted at 50° C. and 1 Hz, with strain sweeping from 0.1% to 20%; $\Delta G'$ is deemed to be the difference between G' at 0.1% strain and at 20% strain. Physical properties of these vulcanizates are compiled below in Table 12 where $T_b$ is tensile strength at break and $E_b$ is percent elongation at break, respectively.

TABLE 12

Physical properties of compounds and vulcanizates

|  | Polymer (Ex. no.) | Compound $ML_{1+4}$ @ 130° C. | 300% modulus at 23° C. (MPa) | $T_b$ @ 23° C. (MPa) | $E_b$ @ 23° C. (%) | $\Delta G'$ (MPa) | tan δ @ 50° C., 3% strain |
|---|---|---|---|---|---|---|---|
| 22 | 18 | 51.3 | 9.44 | 12.8 | 372 | 2.43 | 0.129 |
| 23 | 19 | 64.6 | 10.09 | 13.2 | 360 | 2.30 | 0.119 |
| 24 | 20 | 61.1 | 9.90 | 13.5 | 372 | 1.89 | 0.111 |
| 25 | 21 | 60.8 | 10.35 | 15.2 | 389 | 1.76 | 0.102 |

The data from Table 12 indicate, inter alia, that vulcanizates made with hydrazone-functionalized cis-1,4-polybutadienes (Examples 24-25) provide, compared to those made with unmodified cis-1,4-polybutadienes (Examples 22-23), reductions in tan δ at 50° C. (indicative of reduced hysteresis) and $\Delta G'$ (indicative of reductions in Payne effect due to enhanced interaction between the polymer and carbon black filler).

That which is claimed is:

1. A method for providing a polymer having terminal functionality that comprises an amine group and at least one other heteroatom-containing group, said method comprising reacting a terminally active polymer with a compound comprising one or more 5- or 6-membered aromatic rings, at least one of said one or more aromatic rings comprising in its ring structure at least two heteroatoms selected from O, S and N and further comprising at least one >C=N— segment, said compound being defined by any of the following structures

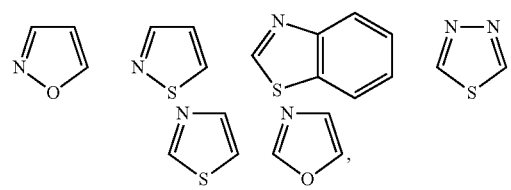

wherein said terminally active polymer reacts with the carbon atom of a >C=N— segment, thereby providing said polymer having terminal functionality.

2. The method of claim 1 further comprising reacting a second terminally active polymer with said compound.

3. The method of claim 2 wherein said second polymer comprises polyene mer.

4. The method of claim 1 wherein said terminally active polymer comprises polyene mer.

5. The method of claim 4 wherein said terminally active polymer is carbanionic.

6. The method of claim 5 wherein said terminally active polymer further comprises vinyl aromatic mer.

7. The method of claim 5 wherein said terminally active polymer has a number average molecular weight of from about 90,000 to about 150,000 Daltons.

8. The method of claim 4 wherein said terminally active polymer is the polymerization product of a process employing a catalyst system which comprises a lanthanide metal.

9. The method of claim 8 wherein said lanthanide metal is Nd.

10. The method of claim 8 wherein said catalyst system further comprises an alkylating agent.

11. The method of claim 10 wherein said catalyst system further comprises a compound that comprises a labile halogen atom.

12. The method of claim 8 wherein said catalyst system further comprises a compound that comprises a labile halogen atom.

13. The method of claim 8 wherein said polymer having terminal functionality has a cis-1,4-linkage content of at least about 95%.

14. The method of claim 8 wherein said polymer having terminal functionality has a 1,2-linkage content of less than about 5%.

15. The method of claim 8 wherein said terminally active polymer has a number average molecular weight of from about 50,000 to about 125,000 Daltons.

16. The method of claim 1 wherein said terminally active polymer is present in a $C_5$-$C_{12}$ alkane liquid.

17. The method of claim 16 wherein said polymer having terminal functionality also is present in a $C_5$-$C_{12}$ alkane liquid.

18. The method of claim 17 further comprising separating said polymer having terminal functionality from said $C_5$-$C_{12}$ alkane liquid.

19. The method of claim 18 further comprising blending said polymer having terminal functionality with one or more particulate fillers so as to provide a filled rubber composition.

20. The method of claim 19 further comprising vulcanizing said filled rubber composition.

* * * * *